United States Patent
Jeong et al.

(10) Patent No.: US 9,510,274 B2
(45) Date of Patent: Nov. 29, 2016

(54) METHOD OF SCANNING ACCESS POINT

(71) Applicant: KT Corporation, Seongnam-si (KR)

(72) Inventors: Yang Seok Jeong, Seoul (KR); Joo Young Kim, Seoul (KR)

(73) Assignee: KT Corporation, Seongnam-si (KR)

( * ) Notice: Subject to any disclaimer, the term of this patent is extended or adjusted under 35 U.S.C. 154(b) by 0 days.

(21) Appl. No.: 14/405,364

(22) PCT Filed: May 27, 2013

(86) PCT No.: PCT/KR2013/004607
§ 371 (c)(1),
(2) Date: Dec. 3, 2014

(87) PCT Pub. No.: WO2013/183881
PCT Pub. Date: Dec. 12, 2013

(65) Prior Publication Data
US 2015/0117424 A1    Apr. 30, 2015

(30) Foreign Application Priority Data

Jun. 4, 2012 (KR) .................. 10-2012-0059864
Apr. 22, 2013 (KR) .................. 10-2013-0043982

(51) Int. Cl.
| | | |
|---|---|---|
| *H04W 48/16* | (2009.01) | |
| *H04W 84/12* | (2009.01) | |
| *G06F 1/32* | (2006.01) | |
| *H04W 48/12* | (2009.01) | |
| *H04L 29/06* | (2006.01) | |
| *H04W 4/18* | (2009.01) | |
| *H04W 28/06* | (2009.01) | |

(Continued)

(52) U.S. Cl.
CPC ............ *H04W 48/16* (2013.01); *G06F 1/3209* (2013.01); *H04L 12/12* (2013.01); *H04L 69/04* (2013.01); *H04L 69/22* (2013.01); *H04W 4/18* (2013.01); *H04W 28/06* (2013.01); *H04W 48/12* (2013.01); *H04W 48/14* (2013.01); *H04W 84/12* (2013.01); *Y02B 60/32* (2013.01); *Y02B 60/34* (2013.01)

(58) Field of Classification Search
None
See application file for complete search history.

(56) References Cited

U.S. PATENT DOCUMENTS

| | | | | |
|---|---|---|---|---|
| 6,085,328 A | * | 7/2000 | Klein ................... | G06F 1/3209 709/227 |
| 6,134,665 A | * | 10/2000 | Klein ................... | G06F 1/3209 709/200 |

(Continued)

FOREIGN PATENT DOCUMENTS

| | | |
|---|---|---|
| JP | 2012-095191 A | 5/2012 |
| KR | 2009-0132650 A | 12/2009 |

(Continued)

OTHER PUBLICATIONS

International Search Report for PCT/KR2013/004607 dated Sep. 26, 2013.

(Continued)

*Primary Examiner* — Andrew Oh
(74) *Attorney, Agent, or Firm* — Sughrue Mion, PLLC

(57) ABSTRACT

A method of scanning an access point is disclosed. The method of scanning the access point includes creating a probe request frame including information created based on an identifier of an access point to be searched, and transmitting the probe request frame. Thus, it is possible to decrease the time and power consumed by a terminal when searching an access point.

14 Claims, 5 Drawing Sheets

(51) Int. Cl.
    *H04L 12/12*      (2006.01)
    *H04W 48/14*      (2009.01)

(56) References Cited

U.S. PATENT DOCUMENTS

| | | | |
|---|---|---|---|
| 8,054,798 B2 | 11/2011 | Jeong et al. | |
| 2004/0017794 A1* | 1/2004 | Trachewsky | H04W 48/20 370/338 |
| 2007/0171910 A1* | 7/2007 | Kumar | H04L 63/0428 370/392 |
| 2008/0198823 A1* | 8/2008 | Shiu | H04W 48/20 370/338 |
| 2008/0205649 A1* | 8/2008 | Harris | H04L 63/0442 380/270 |
| 2008/0298333 A1 | 12/2008 | Seok | |
| 2009/0045943 A1* | 2/2009 | Chen | H04L 63/0853 340/539.11 |
| 2009/0274094 A1* | 11/2009 | Engwer | H04W 48/12 370/328 |
| 2010/0165910 A1* | 7/2010 | Mathews | H04B 7/15528 370/315 |
| 2011/0194542 A1 | 8/2011 | Kim et al. | |
| 2011/0282961 A1* | 11/2011 | Montemurro | H04L 63/0892 709/207 |
| 2012/0128090 A1 | 5/2012 | Seok | |
| 2013/0003654 A1* | 1/2013 | Iyer | H04W 84/22 370/328 |
| 2013/0021949 A1* | 1/2013 | Kaal | H04W 48/16 370/255 |
| 2013/0022032 A1* | 1/2013 | Taghavi et al. | H04W 28/06 370/338 |
| 2013/0235859 A1* | 9/2013 | Sun | H04W 48/08 370/338 |
| 2014/0192713 A1* | 7/2014 | Park | H04B 7/2656 370/328 |
| 2015/0043366 A1* | 2/2015 | Kneckt | H04L 43/0852 370/252 |

FOREIGN PATENT DOCUMENTS

| | | |
|---|---|---|
| KR | 2010-0130535 A | 12/2010 |
| KR | 10-2011-0014619 | 2/2011 |
| KR | 2011-0085836 A | 7/2011 |
| WO | 2005/002116 A2 | 1/2005 |
| WO | 2009/134288 A1 | 11/2009 |

OTHER PUBLICATIONS

Written Opinion for PCT/KR2013/004607 dated Sep. 26, 2013.

* cited by examiner

FIG. 2

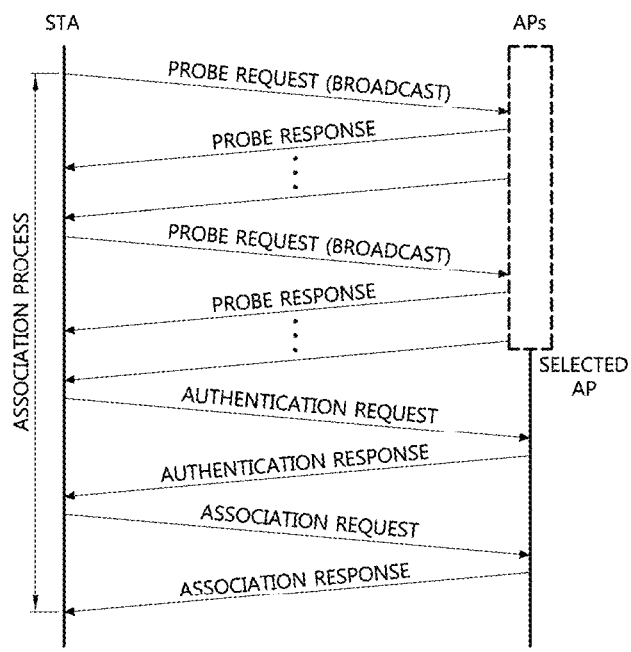

FIG. 3

| ORDER | INFORMATION | NOTES |
|---|---|---|
| 1 | SSID | |
| 2 | Supported rates | |
| 3 | Request information | May be included if dot11MultiDomainCapabilityEnabled is true. |
| 4 | Extended Supported Rates | The Extended Supported Rates element is present whenever there are more than eight supported rates, and it is optional otherwise. |
| Last | Vendor Specific | One or more vendor-specific information elements may appear in this frame. This information element follows all other information elements. |

FIG. 4

| ORDER | INFORMATION | NOTES |
|---|---|---|
| 1 | Timestamp | |
| 2 | Beacon interval | |
| 3 | Capability | |
| 4 | SSID | |
| 5 | Supported rates | |
| 6 | FH Parameter Set | The FH Parameter Set information element is present within Probe Response frames generated by STAs using FH PHYs. |
| 7 | DS Parameter Set | The DS Parameter Set information element is present within Probe Response frames generated by STAs using Clause 15, Clause 18, and Clause 19 PHYs. |
| 8 | CF Parameter Set | The CF Parameter Set information element is present only within Probe Response frames generated by APs supporting a PCF. |
| 9 | IBSS Parameter Set | The IBSS Parameter Set information element is present only within Probe Response frames generated by STAs in an IBSS. |
| 10 | Country | Included if dot11MultiDomainCapabilityEnabled or dot11SpectrumManagementRequired is true. |
| 11 | FH Parameters | FH Parameters, as specified in 7.3.2.10, may be included if dot11MultiDomainCapabilityEnabled is true. |
| 12 | FH Pattern Table | FH Pattern Table information, as specified in 7.3.2.11, may be included if dot11MultiDomainCapabilityEnabled is true. |
| 13 | Power Constraint | Shall be included if dot11SpectrumManagementRequired is true. |
| 14 | Channel Switch Announcement | May be included if dot11SpectrumManagementRequired is true. |

FIG. 5

| ORDER | INFORMATION | NOTES |
|---|---|---|
| 15 | Quiet | May be included if dot11SpectrumManagementRequired is true. |
| 16 | IBSS DFS | Shall be included if dot11SpectrumManagementRequired is true in an IBSS. |
| 17 | TPC Report | Shall be included if dot11SpectrumManagementRequired is true. |
| 18 | ERP Information | The ERP Information element is present within Probe Response frames generated by STAs using ERPs and is optionally present in other cases. |
| 19 | Extended Supported Rates | The Extended Supported Rates element is present whenever there are more than eight supported rates, and it is optional otherwise. |
| 20 | RSN | The RSN information element is only present within Probe Response frames generated by STAs that have dot11RSNAEnabled set to TRUE. |
| 21 | BSS Load | The BSS Load element is present when dot11QosOption- Implemented and dot11QBSSLoadImplemented are both true. |
| 22 | EDCA Parameter Set | The EDCA Parameter Set element is present when dot11QosOptionImplemented is true. |
| Last-1 | Vendor Specific | One or more vendor-specific information elements may appear in this frame. This information element follows all other information elements, except the Requested Information elements. |
| Last-n | Requested information elements | Elements requested by the Request information element of the Probe Request frame. |

FIG. 6

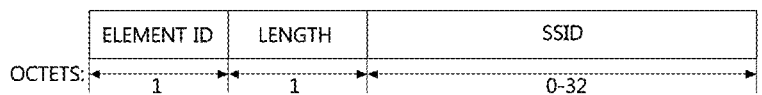

| ELEMENT ID | LENGTH | SSID |
|---|---|---|
| 1 | 1 | 0-32 |

OCTETS:

METHOD OF SCANNING ACCESS POINT

TECHNICAL FIELD

The present invention relates to a method of scanning access points (APs), and more particularly, to an active AP scanning method for quickly scanning APs.

BACKGROUND ART

With the development of information and communication technology, various wireless communication technologies are under development. Among these wireless communication technologies, a wireless local area network (WLAN) enables wireless connection to the Internet at homes or companies or in specific service provision areas using a portable terminal, such as a personal digital assistant (PDA), a laptop computer, and a portable multimedia player (PMP), based on radio frequency (RF) technology.

As standards for WLAN technology, the Institute of Electrical and Electronics Engineers (IEEE) 802.11 standards are under development. IEEE 802.11a provides a transmission speed of 54 Mbps using an unlicensed band at 5 GHz. IEEE 802.11b provides a transmission speed of 11 Mbps using direct sequence spread spectrum (DSSS) at 2.4 GHz. IEEE 802.11g provides a transmission speed of 54 Mbps using orthogonal frequency division multiplexing (OFDM) at 2.4 GHz. IEEE 802.11n provides a transmission speed of 300 Mbps for four spatial streams using multiple-input multiple-output (MIMO)-OFDM. IEEE 802.11n supports a channel bandwidth up to 40 MHz and in this case, provides a transmission speed of 600 Mbps.

With the proliferation of such WLANs and the diversification of applications using WLANs, there is an increasing necessity for new WLAN technology for supporting a higher throughput than a data processing speed of IEEE 802.11n. Very high throughput (VHT) WLAN technology is one of the IEEE 802.11 WLAN technologies proposed to support a data processing speed of 1 Gbps or higher. Among these WLAN technologies, IEEE 802.11ac is being developed as a standard for providing VHT in a band of 6 GHz or lower, and IEEE 802.11ad is being developed as a standard for providing VHT in a 60-GHz band.

In a system based on such a WLAN technology, a terminal transmits a plurality of probe request frames to search for a plurality of APs. Therefore, power consumption increases, and it takes a long time to search for the APs.

DISCLOSURE

Technical Problem

The present invention is directed to providing an access point (AP) scanning method of a terminal for searching for an AP based on a compressed service set identifier (SSID).

The present invention is also directed to providing an operating method of an AP for searching for an AP based on a compressed SSID.

Technical Solution

One aspect of the present invention provides an access point (AP) scanning method of a terminal, the method including: generating a probe request frame including information generated based on an identifier (ID) of a search-target AP; and transmitting the probe request frame.

Here, the information generated based on the ID of the search-target AP may have a shorter length than the ID of the search-target AP.

Here, the ID of the search-target AP may be a service set ID (SSID), and the information generated based on the ID of the search-target AP may be a hash function value of the ID of the search-target AP.

Here, the hash function may be a cyclic redundancy check (CRC) function.

Here, the probe request frame may include at least two pieces of information generated based on the ID of the search-target AP.

Here, the method may further include matching the ID of the search-target AP and the information generated based on the ID with each other and storing the matched ID and information.

Another aspect of the present invention provides an AP scanning method of a terminal, the method including: generating a probe request frame including information generated based on an ID of a search-exclusion AP; and transmitting the probe request frame.

Here, the information generated based on the ID of the search-exclusion AP may have a shorter length than the ID of the search-exclusion AP.

Here, the ID of the search-exclusion AP may be an SSID, and the information generated based on the ID of the search-exclusion AP may be a hash function value of the ID of the search-exclusion AP.

Here, the hash function may be a CRC function.

Here, the probe request frame may include at least two pieces of information generated based on the ID of the search-exclusion AP.

Here, the method may further include matching the ID of the search-exclusion AP and the information generated based on the ID with each other and storing the matched ID and information.

Another aspect of the present invention provides an operating method of an AP, the method including: receiving a probe request frame including information generated based on an ID of the AP; determining whether the information generated based on the ID and included in the probe request frame corresponds to the ID of the AP; and when the information generated based on the ID corresponds to the ID of the AP, transmitting a probe response frame corresponding to the probe request frame.

Here, the information generated based on the ID of the AP may have a shorter length than the ID of the AP.

Here, the ID of the AP may be an SSID, and the information generated based on the ID of the AP may be a hash function value of the ID of the AP.

Here, the hash function may be a CRC function.

Here, the probe response frame may include the information generated based on the ID of the AP.

Here, the information generated based on the ID of the AP may have a shorter length than the ID of the AP.

Here, the ID of the AP may be an SSID, and the information generated based on the ID of the AP may be a hash function value of the ID of the AP.

Here, the hash function may be a CRC function.

Advantageous Effects

According to the present invention, a terminal can search for a plurality of access points (APs) (or exclude the plurality of APs from search targets) by transmitting one probe request frame, and thus a desired AP can be quickly searched for. For this reason, it is possible to reduce the power consumption of a terminal and the time to search for the AP.

Also, by designating an AP that transmits a probe response frame corresponding to a probe request frame, it is possible to prevent a non-designated AP from transmitting a probe response frame, so that the efficiency of a wireless channel can be improved.

Further, a terminal transmits a probe request frame including a compressed service set identifier (SSID), and thus the length of a probe request frame can be reduced. Accordingly, it is possible to reduce the power consumption of the terminal and improve the efficiency of a wireless channel.

Moreover, an AP determines whether or not to transmit a probe response frame by making a comparison not with a whole SSID but with a compressed SSID and thus can quickly transmit a probe response frame.

DESCRIPTION OF DRAWINGS

FIG. 2 is a conceptual diagram illustrating an association process of a terminal in an infrastructure basic service set (BSS).

FIG. 3 is a conceptual diagram illustrating a body constituting a probe request frame.

FIG. 4 is a conceptual diagram illustrating a body (orders 1 to 14) constituting a probe response frame.

FIG. 5 is a conceptual diagram illustrating a body (orders 15 to Last-n) constituting the probe response frame.

FIG. 6 is a block diagram showing a field format for a service set identifier (SSID) information.

MODES OF THE INVENTION

Figure 1:
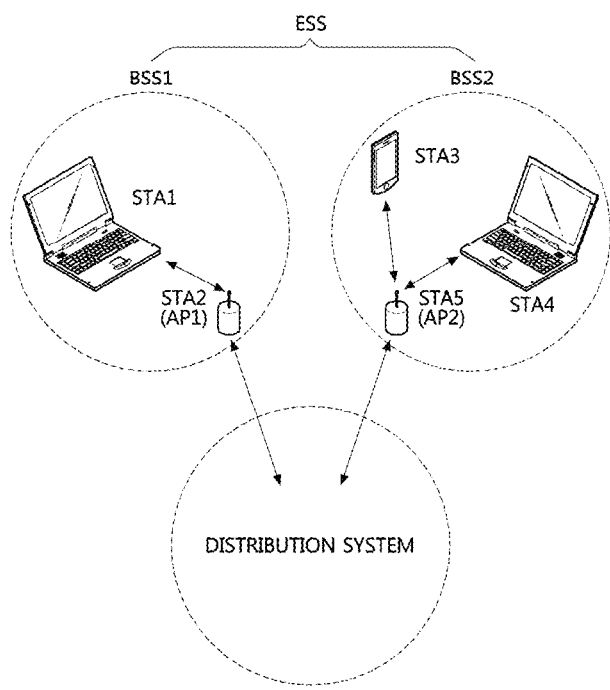
FIG. 1 is a conceptual diagram illustrating an embodiment of the constitution of an Institute of Electrical and Electronics Engineers (IEEE) 802.11 wireless local area network (WLAN) system.

While the present invention is susceptible to various modifications and alternative forms, specific embodiments are shown by way of example in the drawings and described in detail.

It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of state features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in detail with reference to the accompanying drawings. To facilitate overall understanding of the present invention, like numbers refer to like elements throughout the description of the same component will not be reiterated.

Throughout this specification, a station (STA) denotes an arbitrary functional medium including a physical layer interface for medium access control (MAC) and a wireless medium conforming to regulations of an Institute of Electrical and Electronics Engineers (IEEE) 802.11 standard. STAs may be classified as STAs that are access points (APs) and STAs that are non-APs. A STA that is an AP may be simply called an AP, and a STA that is a non-AP may be simply called a terminal.

A STA includes a processor and a transceiver, and may further include a user interface, a display device, and so on. The processor is a unit devised to generate a frame to be transmitted through a wireless network or to process a frame received through the wireless network, and performs various functions to control STAs. The transceiver is functionally connected to the processor and is a unit devised to transmit and receive frames for the STAs via the wireless network.

An AP may be referred to as a centralized controller, a base station (BS), a node-B, an evolved node-B (eNode-B), a base transceiver system (BTS), a site controller, etc., and may include all or some of the functions thereof.

A terminal may be referred to as a wireless transmit/receive unit (WTRU), user equipment (UE), a user terminal (UT), an access terminal (AT), a mobile station (MS), a mobile terminal, a subscriber unit, a subscriber station (SS), a wireless device, a mobile subscriber unit, etc., and may include all or some of the functions thereof.

Here, a desktop computer, a laptop computer, a tablet personal computer (PC), a wireless phone, a mobile phone, a smart phone, an e-book reader, a portable multimedia player (PMP), a portable game machine, a navigation device, a digital camera, a digital multimedia broadcasting (DMB) player, a digital audio recorder, a digital audio player, a digital picture recorder, a digital picture player, a digital video recorder, a digital video player, etc. capable of communication may be used as the terminal.

FIG. 1 is a conceptual diagram illustrating an embodiment of the constitution of an IEEE 802.11 wireless local area network (WLAN) system.

Referring to FIG. 1, an IEEE 802.11 WLAN system includes at least one basic service set (BSS). The BSS denotes a set of STAs STA 1, STA 2 (AP 1), STA 3, STA 4, and STA 5 (AP 2) capable of communicating with each other through successful synchronization, and is not a concept that denotes a specific area.

BSSs may be classified as infrastructure BSSs and independent BSSs (IBSSs), and BSS 1 and BSS 2 are infrastructure BSSs. BSS 1 may include the terminal STA 1, the access point STA 2 (AP 1) that provides a distribution service, and a distribution system (DS) that connects the plurality of access points STA 2 (AP 1) and STA 5 (AP 2). In BSS 1, the access point STA 2 (AP 1) manages the terminal STA 1.

BSS 2 may include the terminals STA 3 and STA 4, the access point STA 5 (AP 2) that provides the distribution service, and the distribution system that connects the plurality of access points STA 2 (AP 1) and STA 5 (AP 2). In BSS 2, the access point STA 5 (AP 2) manages the terminals STA 3 and STA 4.

Meanwhile, an IBSS is a BSS operating in an ad-hoc mode. Since an IBSS does not include any AP, there is no entity that performs a management function at a center. In other words, in an IBSS, the terminals are managed in a distributed manner. In an IBSS, all terminals may be mobile terminals and are not allowed to connect to a DS, thus constituting a self-contained network.

The access points STA 2 (AP 1) and STA 5 (AP 2) provide access to the DS through a wireless medium for the terminals STA 1, STA 3, and STA 4 connected thereto. Communication between the terminals STA 1, STA 3, and STA 4 in BSS 1 and BSS 2 is generally performed through the access points STA 2 (AP 1) and STA 5 (AP 2), but when a direct link is established, direct communication between the terminals STA 1, STA 3, and STA 4 is possible.

A plurality of infrastructure BSSs may be interconnected via a DS. A plurality of BSSs connected through a DS is referred to as an extended service set (ESS). Stations included in an ESS may communicate with each other, and a terminal in the ESS may move from one BSS to another BSS while performing seamless communication.

A DS is a mechanism for an AP to communicate with another AP, in which the AP may transmit a frame for terminals connected to a BSS managed by the AP or may transmit a frame for an arbitrary terminal having moved to another BSS. Also, the AP may exchange frames with an external network, such as a wired network. Such a DS is not necessarily a network, and has any form capable of providing a predetermined distribution service defined in an IEEE 802.11 standard. For example, a DS may be a wireless network, such as a mesh network, or a physical structure that connects APs with each other.

An AP scanning method and an operating method of an AP according to embodiments of the present invention to be described below may be applied to the IEEE 802.11 WLAN system described above, and may be applied to not only the IEEE 802.11 WLAN system but also various networks, such as a wireless personal area network (WPAN) and a wireless body area network (WBAN).

FIG. 2 is a conceptual diagram illustrating an association process of a terminal in an infrastructure BSS.

In order to transmit and receive data in an infrastructure BSS, a terminal STA is connected with an AP.

Referring to FIG. 2, an association process of a terminal STA in an infrastructure BSS is generally divided into 1) a probe step of probing an AP, 2) an authentication step for authentication with the probed AP, and 3) an association step of connecting to the authenticated AP.

The terminal STA may first probe neighboring APs through a probe process. The probe process is classified as a passive scanning method and an active scanning method. The passive scanning method may be performed by "overhearing" beacons transmitted by the neighboring APs. On the other hand, the active scanning method may be performed by broadcasting a probe request frame. The APs receiving the probe request frame may transmit probe response frames corresponding to the probe request frame to the terminal STA. The terminal STA may recognize the presence of the neighboring APs by receiving the probe response frames.

Subsequently, the terminal STA performs an authentication with a probed AP, and may perform an authentication with the plurality of probed APs. Authentication algorithms conforming to an IEEE 802.11 standard are classified as an open system algorithm for exchanging two authentication frames and a shared key algorithm for exchanging four authentication frames. Through a process of exchanging an authentication request frame and an authentication response frame based on such authentication algorithms, the terminal STA may perform an authentication with an AP.

Finally, the terminal STA selects one AP among a plurality of authenticated APs, and performs an association process with the selected AP. In other words, the terminal STA transmits an association request frame to the selected AP, and the AP receiving the association request frame transmits an association response frame corresponding to the association request frame to the terminal STA. In this way, through a process of exchanging the association request frame and the association response frame, the terminal STA may perform the association process with the AP.

FIG. 3 is a conceptual diagram illustrating a body constituting a probe request frame. FIG. 4 is a conceptual diagram illustrating a body (orders 1 to 14) constituting a probe response frame, and FIG. 5 is a conceptual diagram illustrating a body (orders 15 to Last-n) constituting the probe response frame. FIG. 6 is a block diagram showing a field format for a service set identifier (SSID) information.

Referring to FIGS. 3 to 6, in an active search (i.e., scanning) method, a terminal transmits a probe request frame including the SSID of a specific AP to search for the specific AP, or transmits a probe request frame that does not include a specific ID (i.e., in the form of a wildcard SSID) to search for an AP.

An AP receiving the probe request frame transmits a probe response frame corresponding to the probe request frame when the SSID of the AP is included in the probe request frame or an SSID is a wildcard SSID.

Here, a field format for an SSID information includes an element ID field, a length field, and an SSID field. The element ID field may have a size of one octet, the length field may have a size of one octet, and the SSID field may have a size of 0 to 32 octets.

When searching for a plurality of different APs using a probe request frame including a specific ID (SSID), the terminal transmits a plurality of probe request frames including different SSIDs and receives probe response frames corresponding to the probe request frames from the plurality of APs.

For example, when the number of channels is N_ch and the number of APs to be searched for is N_ap in a WLAN system, the terminal transmits N_ch×N_ap probe request frames. Therefore, the power consumption of the terminal increases, and the time taken to search for the APs increases.

When searching for a plurality of different APs using a probe request frame that includes no specific ID (i.e., in the form of a wildcard SSID), the terminal transmits a probe request frame in the form of a wildcard SSID and receives probe response frames from all APs receiving the probe request frame.

At this time, if a small number of terminals and a small number of APs are present, there is no big problem, whereas if several thousand terminals N_sta and tens of APs N_ap are present, N_sta×N_ap probe response frames are simultaneously transmitted. In general, a probe response frame is very long in length and uses a low-level of modulation and coding scheme (MCS), and thus a wireless channel is occupied by unnecessary probe response frames for a very long time. Accordingly, the efficiency of the wireless channel is reduced, and it takes a long time to search for an AP.

Figure 7:
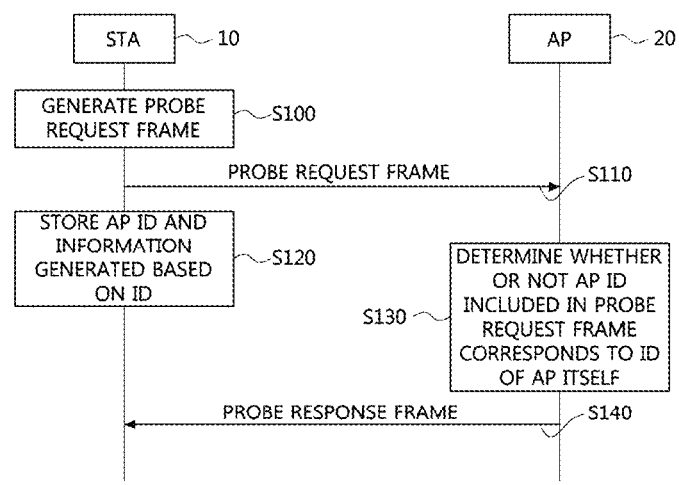
FIG. 7 is a flowchart illustrating an AP scanning method according to an embodiment of the present invention.

FIG. 7 is a flowchart illustrating an AP scanning method according to an embodiment of the present invention.

Referring to FIG. 7, from the aspect of a terminal (STA) 10 in an AP scanning method, the terminal 10 may generate a probe request frame including information generated based on the ID of an AP 20 (S100), may transmit the generated probe request frame (S110), and may receive a probe response frame corresponding to the probe request frame from the AP 20 (S140).

In addition, the terminal 10 may match the ID and the information generated based on the ID with each other and store the matched ID and information (S120). Although step S120 is illustrated to be performed after step S110, the terminal 10 may simultaneously perform step S120 with step S100 or may perform step S120 after step S100.

From the aspect of the AP 20 in an operating method of an AP according to the AP scanning method, the AP 20 may receive a probe request frame including information generated based on the ID of a predetermined AP (S110), may determine whether the information generated based on the ID of the AP and included in the probe request frame corresponds to the ID of the AP 20 (S130), and may transmit a probe response frame corresponding to the probe request frame when the information generated based on the ID and included in the probe request frame corresponds to the ID of the AP 20 (S140).

In step S100, the terminal 10 may generate a probe request frame including information generated based on the ID of a search-target AP 20, or may generate a probe request frame including information generated based on the ID of a search-exclusion AP 20.

Here, the search-target AP 20 denotes an AP 20 that the terminal 10 intends to search for, and the search-exclusion AP 20 denotes an AP 20 that the terminal intends to exclude from search targets. In other words, the search-target AP 20 transmits a probe response frame corresponding to the probe request frame received from the terminal 10, and the search-exclusion AP 20 does not transmit a probe response frame corresponding to the probe request frame received from the terminal 10.

The information generated based on the ID of the search-target AP 20 may have a shorter length than the ID of the search-target AP 20, and the information generated based on the ID of the search-exclusion AP 20 may have a shorter length than the ID of the search-exclusion AP 20. In other words, the terminal 10 may generate the information corresponding to the ID of the search-target AP 20 and having a shorter length than the ID of the search-target AP 20, and or generate the information corresponding to the ID of the search-exclusion AP 20 and having a shorter length than the ID of the search-exclusion AP 20.

The ID of the search-target AP (or search-exclusion AP) 20 may be an SSID. The information generated based on the ID of the search-target AP 20 may be the hash function value of the ID of the search-target AP 20, and the information generated based on the ID of the search-exclusion AP 20 may be the hash function value of the ID of the search-exclusion AP 20.

A hash function may be a cyclic redundancy check (CRC) function, and the hash function value may be a compressed SSID (i.e., a hashed SSID). In other words, the terminal 10 may generate a hashed SSID that is information corresponding to the ID (i.e., the SSID) of the search-target AP 20 based on the CRC function, or generate a hashed SSID that is information corresponding to the ID (i.e., the SSID) of the search-exclusion AP 20 based on the CRC function.

The terminal 10 may generate a probe request frame including at least two pieces of information generated based on the ID of the search-target AP (or search-exclusion AP) 20.

Figure 8:
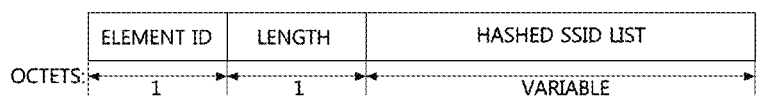
FIG. 8 is a block diagram showing a field format for a compressed SSID information.
Figure 9:
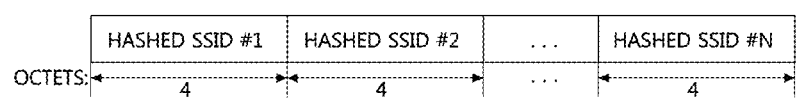
FIG. 9 is a block diagram showing a field format for a compressed SSID list information.

FIG. 8 is a block diagram showing a field format for a compressed SSID information, and FIG. 9 is a block diagram showing a field format for a compressed SSID list information.

Referring to FIGS. 8 and 9, a field format for a compressed SSID information includes an element ID field, a length field, and a hashed SSID list field, and the hashed SSID list information field includes at least one hashed SSID field (hashed SSID #1, hashed SSID #2, . . . , hashed SSID #N). Here, the element ID field may have a size of one octet, the length field may have a size of one octet, the hashed SSID list field may have a variable size, and one hashed SSID field may have a size of four octets.

In other words, the terminal 10 may generate information (i.e., a hashed SSID) corresponding to the ID (i.e., the SSID) of the search-target AP (or search-exclusion AP) 20 using the hash function (i.e., the CRC function). At this time, the terminal 10 may generate a hashed SSID having a size of four octets, and a hashed SSID list field including at least one hashed SSID. Here, a CRC function for generating a 4-octet MAC protocol data unit (MPDU) frame check sequence (FCS) may be used as the hash function.

Referring back to FIG. 7, in step S110, the terminal may transmit the probe request frame including the information generated based on the ID of the search-target AP (or search-exclusion AP) 20, and the AP 20 may receive the probe request frame including the information generated based on the ID of the predetermined AP.

In step S120, the terminal 10 may match the ID of the search-target AP (or search-exclusion AP) 20 and the information generated based on the ID with each other and store the matched ID and information. Since the ID of the AP 20 is an SSID and the information generated based on the ID is a hashed SSID, the terminal 10 may match the SSID and the hashed SSID with each other and store the SSID and the hashed SSID matched with each other.

In step S130, the AP 20 may determine whether the information generated based on the ID and included in the probe request frame corresponds to the ID of the AP 20. Since the ID included in the probe request frame is an SSID and the information generated based on the ID is a hashed SSID, the AP 20 may determine whether the hashed SSID included in the probe request frame and information corresponding to the ID (i.e., the SSID) of the AP 20 are identical.

The AP 20 may generate the information corresponding to the ID (i.e., the SSID) of the AP 20 before or after receiving the probe request frame from the terminal 10. The AP 20 may generate the information (i.e., a hashed SSID) corresponding to the ID (i.e., the SSID) of the AP 20 using a hash function (i.e., a CRC function), and the information (i.e., the hashed SSID) corresponding to the ID (i.e., the SSID) of the AP 20 may have a shorter length than the ID (i.e., the SSID) of the AP 20. The information (i.e., the hashed SSID) corresponding to the ID (i.e., the SSID) and generated using the hash function (i.e., the CRC function) may have a size of four octets.

When a probe request frame including the information generated based on the ID of the search-target AP 20 is received, the AP 20 determines whether the information included in the probe request frame and information corresponding to the ID of the AP 20 are identical. When the information included in the probe request frame and the information corresponding to the ID of the AP 20 are not identical, the AP 20 does not transmit a probe response frame corresponding to the probe request frame.

When a probe request frame including the information generated based on the ID of the search-exclusion AP 20 is received, the AP 20 determines whether the information included in the probe request frame and the information corresponding to the ID of the AP 20 are identical. When the information included in the probe request frame and the information corresponding to the ID of the AP 20 are identical, the AP 20 transmits a probe response frame corresponding to the probe request frame.

In step S140, when the information included in the probe request frame and generated based on the ID of the predetermined AP corresponds to the ID of the AP 20, the AP 20 may transmit a probe response frame corresponding to the probe request frame.

When the probe request frame including the information generated based on the ID of the search-target AP 20 is received, if it is determined that the information included in the probe request frame and the information corresponding to the ID of the AP 20 are identical, the AP 20 may transmit a probe response frame corresponding to the probe request frame.

When the probe request frame including the information generated based on the ID of the search-exclusion AP 20 is received, if it is determined that the information included in the probe request frame and the information corresponding to the ID of the AP 20 are not identical, the AP 20 may transmit a probe response frame corresponding to the probe request frame.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A method by a terminal for performing active scanning in a wireless local area network, the method comprising:
   generating a probe request frame including information generated based on a Service Set Identifier (SSID);
   transmitting, to an access point (AP), the probe request frame; and
   receiving, from the AP, a probe response frame in response to the probe request frame, the probe response frame being transmitted by the AP when the information generated based on the SSID and included in the probe request frame corresponds to the information generated based on the SSID of the AP,
   wherein the information generated based on the SSID has a length shorter than a maximum length of the SSID,
   wherein the information generated based on the SSID is included in a frame body of the probe request frame,
   wherein the probe request frame including the information generated based on the SSID has a length shorter than a probe request frame including the SSID,
   wherein the SSID has a variable length, and the information generated based on the SSID has a fixed length, and
   wherein, after the active scanning, the terminal performs an authentication and an association with the AP based on the information acquired from the probe response frame.

2. The method of claim 1, wherein the SSID is maximum 32 octets in length, the information generated based on the SSID is 4 octets in length.

3. The method of claim 1, wherein the information generated based on the SSID is a hash function value of the SSID.

4. The method of claim 3, wherein the hash function is a cyclic redundancy check (CRC) function.

5. The method of claim 4, wherein the CRC function is defined for generating a Frame Check Sequence (FCS), the FCS is 4 octets in length.

6. The method of claim 1, wherein the information generated based on the SSID corresponds to SSID of at least one AP.

7. A method by an access point (AP) operating for supporting active scanning of a terminal in a wireless local area network, the method comprising:
   receiving, from the terminal, a probe request frame including information generated based on a Service Set Identifier (SSID);
   determining whether the information generated based on the SSID and included in the probe request frame corresponds to information generated based on the SSID of the AP;
   when the information generated based on the SSID and included in the probe request frame corresponds to the information generated based on the SSID of the AP, transmitting, to the terminal, a probe response frame in response to the probe request frame,
   wherein the information generated based on the SSID has a length shorter than a maximum length of the SSID,
   wherein the information generated based on the SSID is included in a frame body of the probe request frame,
   wherein the probe request frame including the information generated based on the SSID has a length shorter than a probe request frame including the SSID,
   wherein the SSID has a variable length, and the information generated based on the SSID has a fixed length, and
   wherein, after the active scanning, the terminal performs an authentication and an association with the AP based on the information acquired from the probe response frame.

8. The method of claim 7, wherein the SSID is maximum 32 octets in length, the information generated based on the SSID is 4 octets in length.

9. The method of claim 7, wherein the information generated based on the SSID is a hash function value of the SSID, and the information generated based on the SSID of the AP is a hash function value of the SSID of the AP.

10. The method of claim 9, wherein the hash function is a cyclic redundancy check (CRC) function.

11. The method of claim 10, wherein the CRC function is defined for generating a Frame Check Sequence (FCS), the FCS is 4 octets in length.

12. The method of claim 11, wherein the information generated based on the SSID corresponds to SSID of at least one AP.

13. A terminal for performing active scanning in a wireless local area network, the terminal comprising:
a transceiver; and
a processor,
wherein the processor is configured to:
generate a probe request frame including information generated based on a Service Set Identifier (SSID);
transmit, using the transceiver, to an access point (AP), the probe request frame; and
receive, from the AP, a probe response frame in response to the probe request frame, the probe response frame being transmitted by the AP when the information generated based on the SSID and included in the probe request frame corresponds to the information generated based on the SSID of the AP,
wherein the information generated based on the SSID has a length shorter than a maximum length of the SSID,
wherein the information generated based on the SSID is included in a frame body of the probe request frame,
wherein the probe request frame including the information generated based on the SSID has a length shorter than a probe request frame including the SSID,
wherein the SSID has a variable length, and the information generated based on the SSID has a fixed length, and
wherein, after the active scanning, the terminal performs an authentication and an association with the AP based on the information acquired from the probe response frame.

14. An access point (AP) operating for supporting active scanning of a terminal in a wireless local area network, the AP comprising:
a transceiver; and
a processor,
wherein the processor is configured to:
receive, using the transceiver, from the terminal, a probe request frame including information generated based on Service Set Identifier (SSID);
determine whether the information generated based on the SSID and included in the probe request frame corresponds to information generated based on the SSID of the AP; and
when the information generated based on the SSID and included in the probe request frame corresponds to the information generated based on the SSID of the AP, transmit, using the transceiver, to the terminal, a probe response frame in response to the probe request frame, and
wherein the information generated based on the SSID has a length shorter than a maximum length of the SSID,
wherein the information generated based on the SSID is included in a frame body of the probe request frame,
wherein the probe request frame including the information generated based on the SSID has a length shorter than a probe request frame including the SSID,
wherein the SSID has a variable length, and the information generated based on the SSID has a fixed length, and
wherein, after the active scanning, the terminal performs an authentication and an association with the AP based on the information acquired from the probe response frame.

* * * * *